United States Patent
Ben-Houidi et al.

(10) Patent No.: US 8,923,162 B2
(45) Date of Patent: Dec. 30, 2014

(54) MANAGEMENT OF PRIVATE VIRTUAL NETWORKS

(75) Inventors: Zied Ben-Houidi, Paris (FR); Mickael Meulle, Paris (FR)

(73) Assignee: Orange, Paris (FR)

( * ) Notice: Subject to any disclaimer, the term of this patent is extended or adjusted under 35 U.S.C. 154(b) by 68 days.

(21) Appl. No.: 13/579,416

(22) PCT Filed: Feb. 7, 2011

(86) PCT No.: PCT/FR2011/050240
§ 371 (c)(1),
(2), (4) Date: Aug. 16, 2012

(87) PCT Pub. No.: WO2011/101575
PCT Pub. Date: Aug. 25, 2011

(65) Prior Publication Data
US 2012/0314618 A1    Dec. 13, 2012

(30) Foreign Application Priority Data
Feb. 16, 2010  (FR) .................................... 10 51097

(51) Int. Cl.
| | |
|---|---|
| *H04L 12/28* | (2006.01) |
| *H04L 12/741* | (2013.01) |
| *H04L 12/46* | (2006.01) |
| *H04L 12/701* | (2013.01) |
| *H04L 12/751* | (2013.01) |
| *H04L 12/715* | (2013.01) |

(52) U.S. Cl.
CPC ............. *H04L 45/54* (2013.01); *H04L 12/4641* (2013.01); *H04L 45/00* (2013.01); *H04L 45/025* (2013.01); *H04L 45/04* (2013.01); *Y10S 370/902* (2013.01)
USPC ........... 370/255; 370/351; 370/389; 370/401; 370/902; 709/220; 709/242

(58) Field of Classification Search
CPC ... H04L 12/4641; H04L 45/00; H04L 45/025; H04L 45/04; H04L 45/54
USPC ......... 370/254, 255, 351, 352, 389, 400, 401, 370/432, 901, 902; 709/238, 239, 242
See application file for complete search history.

(56) References Cited

U.S. PATENT DOCUMENTS 6,980,548 B1 * 12/2005 Zaccone et al. ............... 370/392
7,027,396 B1 *  4/2006 Golan et al. .................. 370/232

(Continued)

OTHER PUBLICATIONS

Kompella (Editor), "Layer 2 VPNs Over Tunnels; draft-kompella-l2vpn-12vpn-01.txt," Juniper Networks, IETF Standard-Working-Draft, Internet Engineering Task Force, IETF, CH, No. 1, pp. 1-27 (Jan. 1, 2006).

(Continued)

*Primary Examiner* — Ahmed Elallam
(74) *Attorney, Agent, or Firm* — Drinker Biddle & Reath LLP

(57) ABSTRACT

A transmission system including a plurality of edge routers. The system manages a plurality of virtual networks, each network linking a plurality of remote networks therebetween. An edge router manages a topology table that indicates one or more adjacent edge routers for a given virtual network and at least one remote network identifier for an adjacent edge router. A route change made in relation to a remote network of a given virtual network is detected on the edge router. On the basis of the topology table, one or more adjacent edge routers and the corresponding remote network identifiers are determined for the virtual network. The route change is transmitted to said adjacent edge routers by indicating the corresponding remote network identifiers.

8 Claims, 4 Drawing Sheets

(56) References Cited

U.S. PATENT DOCUMENTS

| | | | |
|---|---|---|---|
| 7,274,704 B1 * | 9/2007 | Ould-Brahim et al. | 370/409 |
| 7,369,556 B1 * | 5/2008 | Rekhter et al. | 370/392 |
| 7,894,434 B2 * | 2/2011 | Anantharamaiah et al. | 370/392 |
| 7,969,988 B2 * | 6/2011 | Geib | 370/395.31 |
| 8,027,347 B2 * | 9/2011 | Ould-Brahim | 370/397 |
| 8,170,033 B1 * | 5/2012 | Kothari et al. | 370/395.53 |
| 8,532,087 B2 * | 9/2013 | Kojima et al. | 370/352 |
| 8,705,513 B2 * | 4/2014 | Van Der Merwe et al. | 370/351 |
| 2007/0260746 A1 | 11/2007 | Mirtorabi et al. | |
| 2008/0170573 A1 | 7/2008 | Ould-Brahim | |
| 2010/0290485 A1 * | 11/2010 | Martini et al. | 370/477 |

OTHER PUBLICATIONS

Rozen et al., "RFC 4364 on BGP/MPLS IP Virtual Private Networks (VPNs)," IETF draft-ietf-l3vpn-rfc2547bis-03.txt, pp. 1-4 (Feb. 2006).

* cited by examiner

MANAGEMENT OF PRIVATE VIRTUAL NETWORKS

CROSS-REFERENCE TO RELATED APPLICATIONS

This application is the U.S. national phase of the International Patent Application No. PCT/FR2011/050240 filed Feb. 7, 2011, which claims the benefit of French Application No. 1051097 filed Feb. 16, 2010, the entire content of which is incorporated herein by reference.

FIELD OF THE INVENTION

The present invention relates to the field of telecommunications, and more particularly to networks of VPN type (for 'Virtual Private Network').

BACKGROUND OF THE INVENTION

A virtual private network VPN corresponds to an extended local network obtained by interconnecting various mutually remote local networks by way of an infrastructure in general managed by an operator. This infrastructure is a communication system which may be shared by various virtual private networks VPN, while safeguarding a level of mutual security and separation of these VPNs. For this purpose, provision is made to link the various local networks, or sites, of one and the same VPN, using virtual links, or else tunnels, via the shared system used. A tunnel corresponds in some sense to an encapsulation of data to be transmitted.

An MPLS ('MultiProtocol Label Switching') architecture is conventionally used for installing such a shared system for VPN networks. Within this architecture which allows the transport of communications between the various sites of one and the same VPN, it is conventional to implement a routing protocol of BGP ('Border Gateway Protocol') type such as defined by IETF document RFC 4364 (BGP/MPLS IP Virtual Private Networks). Such an IP/VPN BGP/MPLS network allows complete implementation for VPN networks.

In this type of network, an operator can manage the shared system and offer a level 3 connectivity VPN network service (that is to say of IP ('Internet Protocol') type) to clients having remote sites. Thus, between the IP networks (or sites) of one and the same client, provision is made to establish virtual IP links via the operator's system. The VPN topology or topologies of each client are determined by the latter and they are configured by the operator on the system's BGP-type equipment. The mesh between sites in a client's VPN topology can for example correspond to a completely meshed network. Such is the case when each VPN site is linked by a virtual link to each of the other sites. It can also form a star network. Such is the case when each site is linked to a central site by virtual IP link.

This type of network relies on a principle of announcing routes by broadcasting information within the whole of the shared system. More precisely, according to a routing protocol of BGP type, like the MP-BGP ("MultiProtocol BGP") protocol, for each site of a VPN, a border router announces the routes for reaching this site to the whole of the system, that is to say to all the other border routers of the system. A border router belongs to the operator's infrastructure and is the interface of the VPN sites.

Furthermore, the implementation of the broadcasting of these route announcements relies on a particular mesh within the system, which may be either a complete mesh between all the border routers, or a complete mesh between route reflectors (RR).

These principles are readily applicable in a BGP/MPLS system of reasonable size. However, above a certain number of managed VPN sites, transmitting the route announcements within the whole of the system may overload the network globally, and may induce a certain unwieldiness of processing in particular in the case of the updating of the routing. Consequently, upon changes of routes, a new convergence of the routing might take too much time and might give rise to packet losses.

SUMMARY OF THE INVENTION

The present invention is aimed at improving the situation.

A first aspect of the invention proposes a method of routing in a transmission system comprising a plurality of border routers;
said system managing a plurality of virtual networks, each linking several mutually remote networks;
a border router managing a topology table indicating, for a given virtual network, one or more adjacent border routers and for an adjacent border router, at least one remote-network identifier;
said method comprising the following steps at the level of said border router:
/a/ detecting a change of route relating to a remote network of said given virtual network;
/b/ on the basis of the topology table, determining for said virtual network, one or more adjacent border routers and the corresponding remote-network identifier or identifiers; and
/c/ transmitting the change of route to said adjacent border routers, while indicating the remote-network identifier or identifiers determined.

Here, the expression 'transmission system' is intended to mean a network offering a service which allows the installing of a plurality of virtual networks, of VPN type. Thus, the transmission system may be managed by an operator so as to enable a client, who has remote networks, to link them via a virtual network of VPN type.

The expression 'remote network' is intended to mean any type of site of a client, that is to say any type of network for transmitting packets for example of IP type, that can be linked with another or several other client sites via the transmission system so as to form a VPN of this client.

The expression 'detection of a change of route' is intended to mean equally receipt of an announcement message indicating a change of route or a change of a local route performed by configuration. The change of route is detected for a remote network connected directly to the border router considered. In step /a/, any type of announcement message according to a routing protocol adapted for indicating a change of route, that is to say a new route to be taken into account for the routing in the VPN considered or a route to be deleted in the routing applied in this VPN, may be used. The adapted routing protocol may be BGP, OSPF ('Open Shortest Path First'), ISIS ('Intermediate System to Intermediate System'), etc.

In step /c/, provision may be made for an acknowledgment mechanism to allow a border router to ensure that the changes of route that it has transmitted have indeed been received.

In this context, provision is advantageously made for a border router of the transmission system to manage a topology table on the basis of which it can determine to which other border router(s) of the network and the corresponding remote networks (via the identifiers), it must transmit a change of route originating from a remote network which is connected directly to it. Provision is made for the remote networks to be identified at the level of a border router to which they are directly linked by a remote-network identifier. More precisely, this remote-network identifier identifies a particular resource, internal to the border router considered, and in charge of the interface with the remote network.

More precisely, such a topology table of a border router, according to one embodiment of the present invention, indicates one or more adjacent border routers for a given virtual network, that is to say a list of border routers which are linked to it for the topology of the virtual network considered, as well as corresponding remote-network identifiers. In fact, the set of topology tables managed by the border routers of the network represents the topologies of the various VPNs installed in the shared system considered.

No limitation is attached to the type of remote-network identifier used. It is a matter here of allowing the other border routers to identify the particular resource in charge of the interface with a given remote network for a given VPN. Indeed, a remote network of a given VPN connects up to the transmission system via a given border router. Thus, this border router hosts an interface management with this remote network. The remote-network identifiers make it possible to identify this particular resource within the transmission system.

By virtue of such a topology table at the level of a border router, it is advantageously possible to reduce the number of messages sent in the transmission network upon a change of route. Indeed, the change of route can then be transmitted solely to one or more adjacent border routers, that is to say the routers which are adjacent to it in the sense of the topology of the VPN concerned, while indicating the corresponding remote-network identifiers, that is to say those which correspond to the VPN considered.

It is possible to optimize, in a simple and effective manner, the distribution of the information about a change of route, which may be via a message for announcing routes, within such a network since a route announcement is transmitted only to the items of equipment for which this route is pertinent, in contradistinction to what is provided for in a prior art network of BGP/MPLS type, in which these route announcements are broadcast to all the border routers.

For this purpose, in such a context, provision is made to create the topology tables of the managed VPN or VPNs at the level of a border router in a preliminary phase upstream of any transmission of route announcement, and then to keep them updated as a function of the alterations in the actual topologies of the VPNs considered. Provision may be made to create VPNs by managing virtual tunnels according to various technologies such as for example MPLS, IPsec ('IP security') GRE ('Generic Routing Encapsulation') etc. These virtual tunnels represent the topology of the clients' VPNs. No limitation is attached to the type of technology used for the creation of these virtual tunnels.

In this topology table management phase, each border router learns the list of its adjacent routers for each VPN which relates to it, that is to say for each VPN for which it represents an accessway to the system for one of the sites of the VPN, in association with the corresponding remote-network identifiers.

To construct and update the topology tables, provision may for example be made to implement principles similar to those which are implemented in a conventional network of BGP/MPLS IP VPN type, using a protocol of MP-BGP type in particular. A route according to the MP-BGP protocol is such that it makes it possible to reach all the border routers of the operator's network.

In one embodiment of the present invention, provision is thus advantageously made to separate a VPN topology creation step from a step of mutually distributing the route announcements making it possible to reach the various sites.

It is important to note that by transmitting the route announcement messages only to the border routers for which this announcement is pertinent, it is possible to reduce the routing convergence time when a change of route is announced, like deletion or addition of a route. Thus, by reducing convergence, it is possible to avoid packet losses.

By virtue of such characteristics, each border router of the network receives only the messages which it needs since the messages are transmitted in tunnels by VPN indicated previously in the topology tables.

Such a routing method is therefore particularly adapted for a shared system managing a significant number of VPNs.

It should be noted that the step of creating virtual tunnels relies on a general broadcasting of messages in the shared system, whereas the routing update step is carried out advantageously by targeted transmission to the items of equipment concerned. Now, as the VPN topology generally has to be updated less frequently than the routing, this embodiment is particularly advantageous to implement and makes it possible to appreciably reduce the routing-related traffic.

Provision may be made for the topology table of a virtual network at the level of a border router to be updated according to a topology protocol as a function of the configuration of the virtual network, this topology protocol comprising a topology broadcasting signal indicating a border router by which this remote network is connected to the transmission system and the corresponding remote-network identifier.

This topology protocol makes it possible to broadcast the information on the virtual tunnels corresponding to the topology of a client VPN according to MPLS, IPsec, or else GRE for example.

In one embodiment of the present invention, the border router furthermore manages a routing table per virtual network indicating information about paths available for transmitting packets to the remote networks of said virtual network. This routing table is updated on receipt of a change of route transmitted by another border router, the change of route indicating whether a path should be added, deleted or modified in the routing table.

Thus, each border router of a VPN is able to route packets received within a VPN on the basis of the information stored and kept updated in its routing tables. It therefore manages at least one routing table per VPN which it updates on the basis of the route announcements received within one and the same VPN via the virtual topology tunnels.

A change of route relating to a remote network which is connected directly to the border router may be detected according to a routing protocol used between the remote network and the border router. Such a change of route for the routes to the remote network considered is announced to the adjacent border routers. It should be noted that this type of announcement is subsequent to a topology learning phase according to one embodiment of the present invention.

Thus, provision is made for the routing tables managed by a border router to be updated according to two pathways. On the one hand, they are updated according to a routing protocol of PE-CE type (that is to say between remote network (CE (for 'Customer Edge') designating a gateway router of the remote network) and border router PE (for 'Provider Edge'))

and on the other hand they are updated by transmission of the changes of routes within the transmission system by the various border routers in step /c/.

A second aspect of the present invention proposes a border router in a transmission system adapted for implementing a routing method according to the first aspect of the present invention.

A third aspect of the present invention proposes a transmission system comprising a plurality of border routers according to the second aspect of the present invention.

A fourth aspect of the present invention proposes a computer program comprising instructions for the implementation of the method of the first aspect of the present invention when this program is executed by a processor.

A fifth aspect of the present invention proposes a topology broadcasting signal in a transmission system according to the third aspect of the present invention in which each border router manages a topology table indicating, for a given virtual network, one or more adjacent border routers, and for an adjacent border router, at least one corresponding remote-network identifier;

said topology broadcasting signal indicating a border router by which the remote network is connected to the transmission system and a corresponding remote-network identifier.

Other aspects, aims and advantages of the invention will become apparent on reading the description of one of its embodiments.

BRIEF DESCRIPTION OF THE DRAWINGS

The invention will also be better understood with the aid of the drawings, in which.

DETAILED DESCRIPTION

Figure 1:
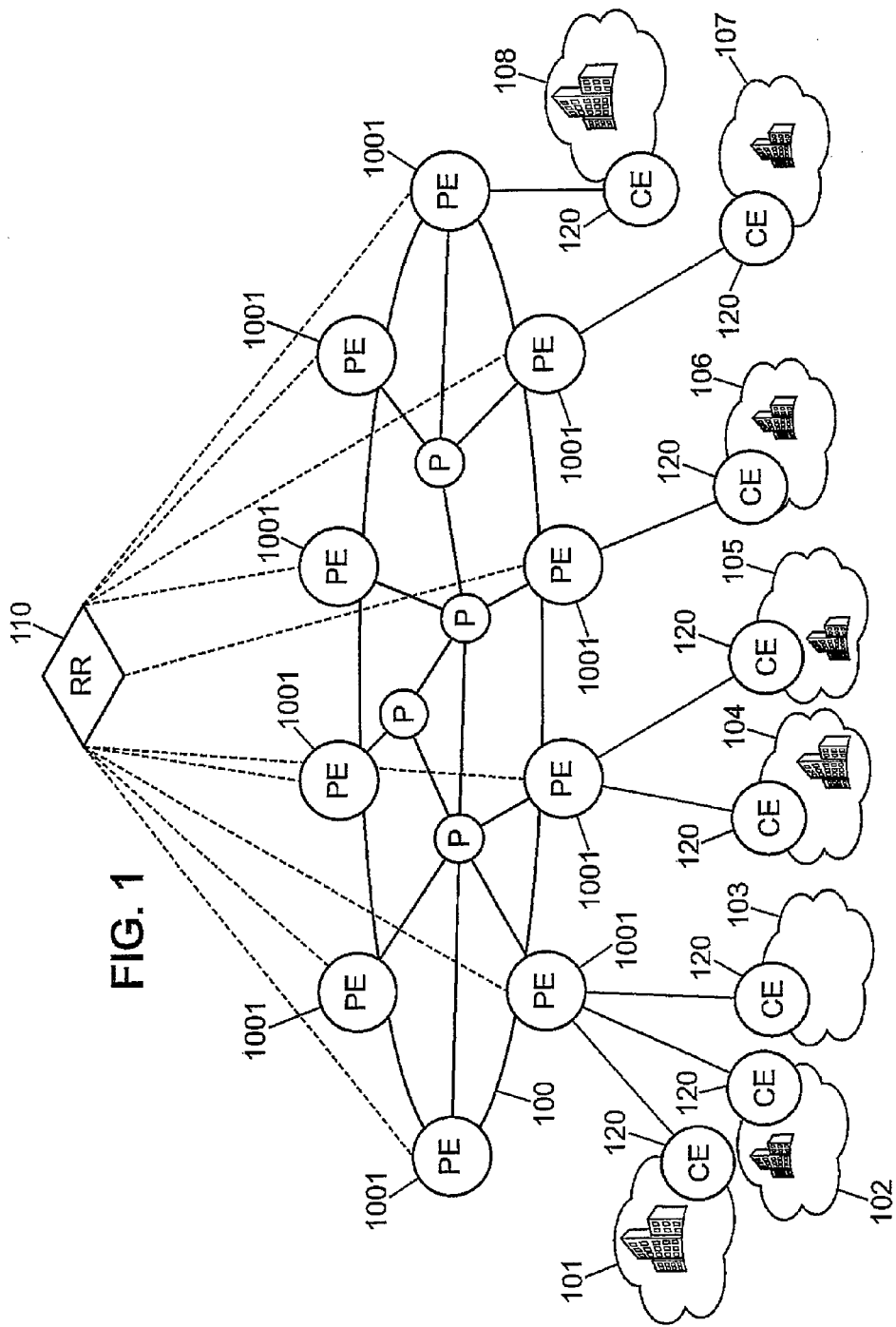
FIG. 1 illustrates a transmission system according to one embodiment of the present invention.

FIG. 1 illustrates a transmission system according to one embodiment of the present invention. A transmission system 100 comprises several border routers 1001 (or PE for 'Provider Edge') which may be linked to client sites 101 to 108 respectively, or else referenced in the guise of remote networks. In the example illustrated in FIG. 1, the border routers are also linked to a so-called reflector route router RR (RR for 'Route Reflector') 110 and to routers P which are core routers of the system.

It is for example possible to consider that this architecture is an architecture of the MPLS type in which virtual networks of VPN type are readily installed, offering a level 3 connectivity service between remote networks of IP type 101 to 108. The remote networks 101-108 use gateway routers called routers CE 120 for linking up to the transmission system 100, or else referenced operator network, via the border routers PE 1001. The PE routers 1001 use here for example a protocol of MPLS type to transport the communications between the various routers CE of sites belonging to one and the same VPN.

In one embodiment of the present invention, in such a system 100 of MPLS type, the communications between various remote sites belonging to one and the same VPN rely on the MPLS protocol. For this purpose, MPLS tunnels are installed via the routers P and the border routers PE 1001 on the basis of switching tables, termed label switching tables, which are updated according to a label distribution protocol of LDP ('Label Distribution Protocol') type. The installation of these tunnels of MPLS type within the network 100 does not form the subject of the present invention. No limitation is attached to the present invention with regard to this technical aspect. Provision may in particular be made to implement technologies of IPsec, GRE type, etc.

Figure 2:
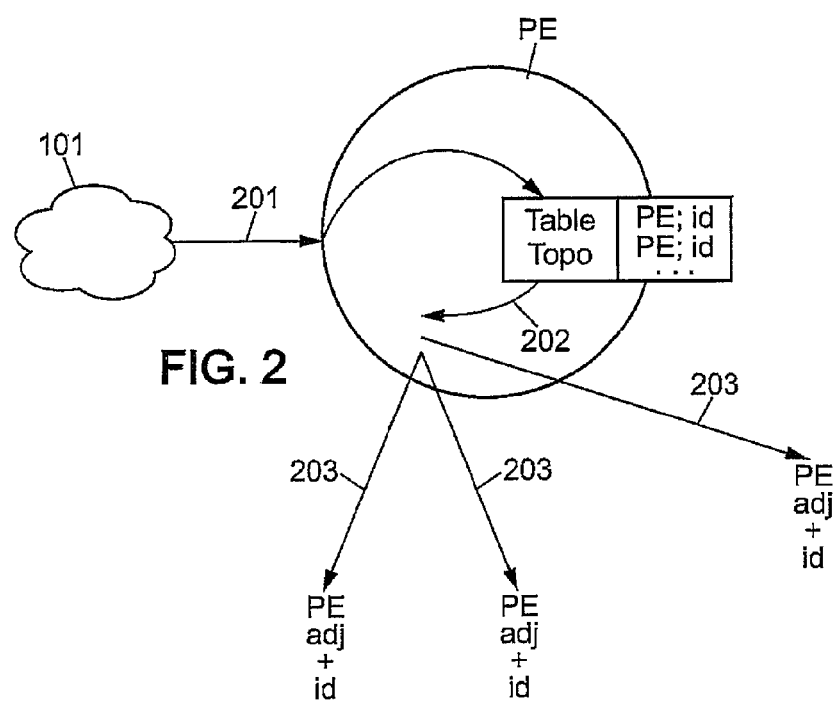
FIG. 2 illustrates the main steps of a method for broadcasting routes according to one embodiment of the invention.

FIG. 2 illustrates the main steps of a routing method according to one embodiment of the present invention.

In a transmission system 100 such as that illustrated in FIG. 1, provision is made to carry out the following steps at the level of a border router of the network.

In a step 201, a change of route is detected relating to a remote network, connected directly to the border router considered, belonging to a given virtual network. Next, in a step 202, one or more border routers are determined to which it is appropriate to transmit this message, while indicating the corresponding remote-network identifiers.

This step is advantageously performed on the basis of a topology table kept updated at the level of the border router so as to illustrate the topology of one or more VPNs which travel via this border router. This topology table is filled upstream of this route announcement transmission step. It represents the topology of a given VPN at the level of the border router considered. In this sense, for a given VPN, it lists the adjacent border routers PE with their corresponding remote-network identifier according to the topology of this VPN.

Thus, for a VPN comprising a site 101 which is linked to the system by a border router PE1, a site 103 which is linked to the system by a border router PE3 and a site 104 which is linked to the system by a border router PE4, provision may be made for PE1 to have a topology table indicating in particular PE3 and PE4 in the guise of adjacent PEs for the VPN considered.

No limitation is attached to the mechanism implemented to fill such a topology table. Any information broadcasting protocol may be used within the transmission system considered. The information broadcast in a topology protocol according to one embodiment of the present invention is dependent on the technology used to construct the tunnels of a VPN network. Generally, provision may be made to broadcast the following information:

an identifier of the border router sending the topology message, an identifier of the remote network connected at the level of this border router, this local identifier making it possible to identify a management entity, in charge of the interface with the remote network, and an item of information relating to the topology of the VPN, for example in a manner similar to the Route Targets in VPN networks under BGP MPLS, such as defined in IETF document RFC 4364.

By proceeding thus, each border router informs, in general by broadcasting, all the other border routers of the transmission system considered as regards all the remote networks which are connected directly to it according to the topology of a given VPN, by indicating a remote-network identifier for each client site which is connected directly to it.

In the case where a border router manages a plurality of VPNs, provision may be made for the border router to manage a topology table per VPN, or else a single topology table containing topology information of several VPNs.

Be that as it may, such a topology table at the level of a given PE indicates a list of adjacent border routers, as well as the corresponding remote-network identifiers, for a remote network connected directly to this given PE, in a VPN.

Thus, when the border router detects a change of route from a client site, it determines the VPN concerned, that is to say the VPN to which the site from which it has received the route announcement belongs. Next, by virtue of the topology table, it identifies the border routers, and the corresponding remote-network identifiers, which are adjacent to it and which also belong to this VPN. Thereafter, in a step 203, it transmits the change of route to these adjacent border routers identified in the topology table, and associated with the corresponding remote-network identifiers.

In a more precise manner, a border router manages an interface per remote network connected directly to it, that is to say per remote network for which it is a point of entry to the transmission system. Each of these interfaces corresponds to an interface of a PE border router with a router, termed a gateway router CE, of the remote network. When creating and maintaining topology tables according to one embodiment of the present invention, this entails linking these PE-CE interfaces of each VPN topology. The PE routers exchange between themselves information relating to these interfaces. A topology table updating step makes it possible to create virtual tunnels between all the interfaces connecting sites which are linked together in one and the same VPN topology.

To initially create such topology tables, provision may be made for each interface of a border router which connects a VPN site to be configured by an operator of the transmission system by indicating imported target routes (or RTs for 'Route Target') and exported target routes RTs, in a manner similar to what is specified for MPLS BGP VPN networks. According to the invention, a PE router announces information to all the other PE routers which makes it possible to identify each of its interfaces (by indicating a PE identifier (or label), and an interface identifier (or internal label)) as well as the imported RTs. This behavior differs from that envisaged for MPLS BGP VPN networks in which a PE router announces the exported RTs to the other routers. By virtue of the present invention, there is no longer any requirement to flood the system through the routes containing the exported RTs.

The announcement of this information allows each PE router to determine, for each of its local interfaces to a site, which are the remote interfaces with which to establish a virtual link for the VPN considered.

By virtue of these topology tables, the route announcement transmission in the network is advantageously targeted and makes it possible cleverly to avoid flooding the network through the sending of messages which are ultimately only useful to just part of the border routers of the network, more precisely to those which form part of the same VPN.

Figure 3:
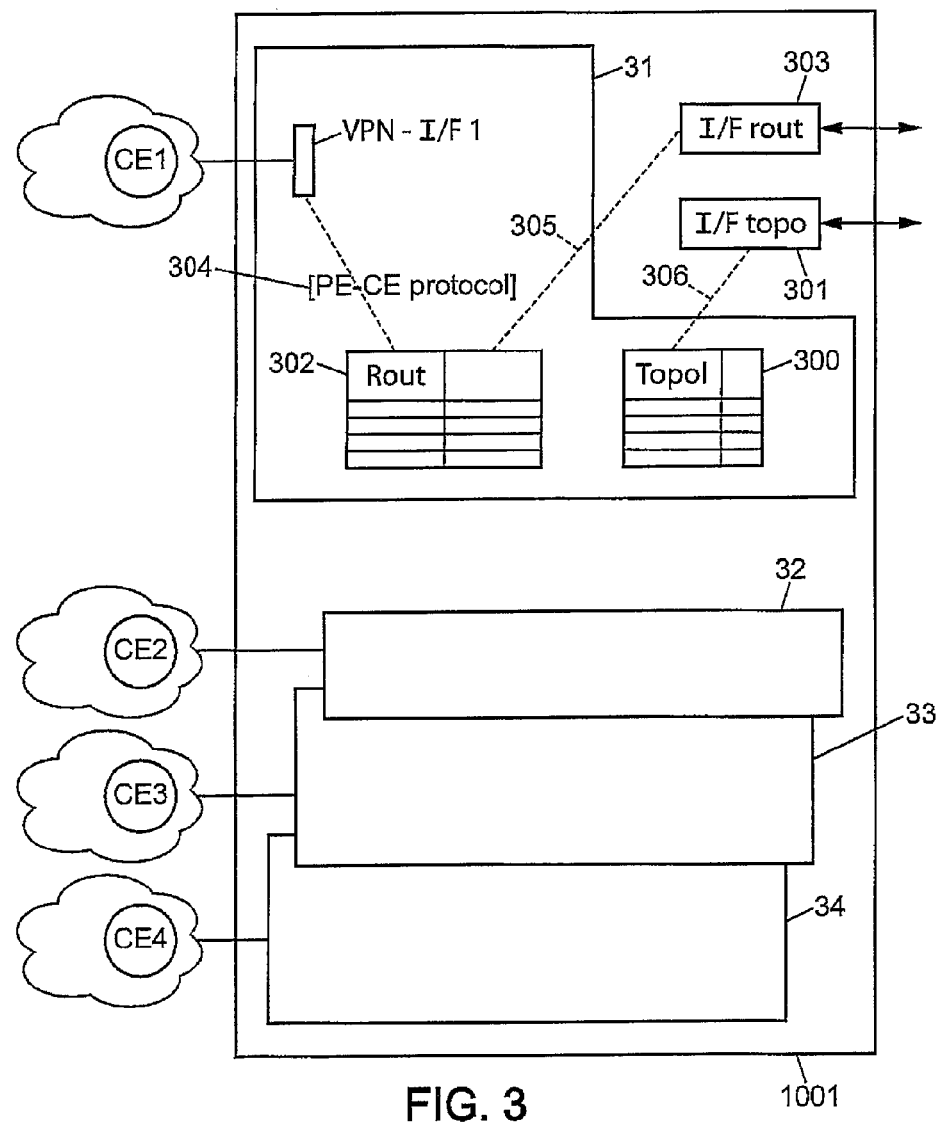
FIG. 3 illustrates an architecture of a border router according to one embodiment of the present invention.

FIG. 3 illustrates an architecture of a border router according to one embodiment of the present invention.

Such a border router 1001 makes it possible to link to the system the remote network routers CE1 to CE4 which belong respectively to the networks VPN1, VPN2, VPN3 and VPN4.

In this embodiment of the present invention, provision is made to implement a unit for managing topology and routing by interface with a client router at the level of the PE router considered. Of course, provision may readily be made for an entity for managing topology and an entity for managing routing separately at the level of a border router on the basis of what follows.

Thus, in the example illustrated, the PE router 1001 has a topology and routing management entity 31 which is in charge of managing the VPN 1 and the interface with the router CE1, a management entity 32 which is in charge of managing the VPN 2 and the interface with CE2, a management entity 33 which is in charge of managing the VPN 3 and the interface with CE3 and a management entity 34 which is in charge of managing the VPN 4 and the interface with CE4.

Figure 4:
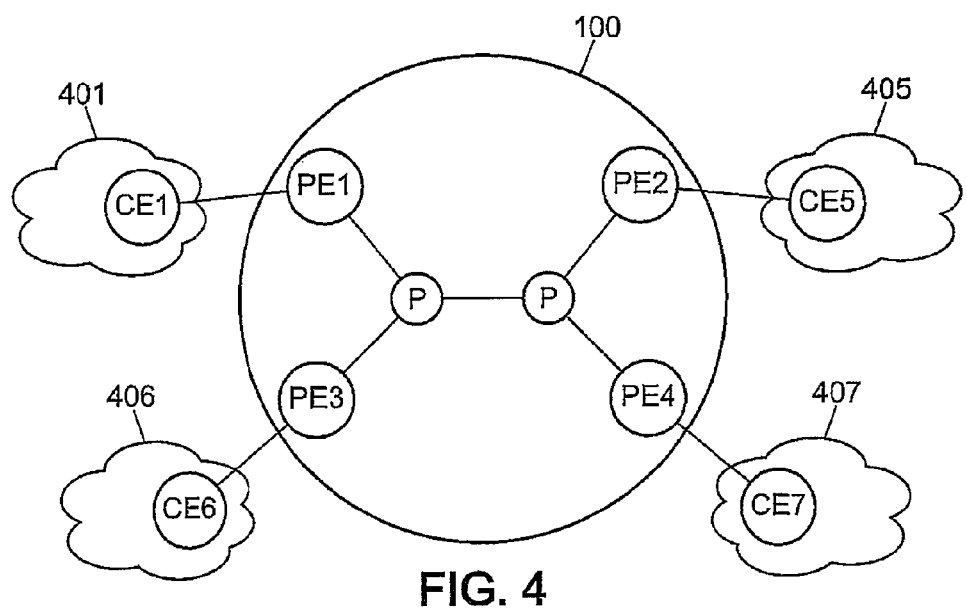
FIG. 4 illustrates a topology of a VPN according to one embodiment of the present invention.

The topology of the VPN1 considered by way of illustration is illustrated in FIG. 4. It links the remote networks 401, 405, 406 and 407. More precisely, the remote network 401 is linked to the system 100 via its client router CE1 and the border router PE1. The remote network 405 is linked to the system 100 via its client router CE5 and the border router PE2. The remote network 406 is linked to the system 100 via its client router CE6 and the border router PE3. The remote network 407 is linked to the system 100 via its client router CE7 and the border router PE4.

The management entity 31 maintains a topology table 300 corresponding to the topology of the VPN 1, for which the PE1 considered manages the interface with the remote router CE1 of the network 401. This topology table lists the PE routers which are adjacent to PE1, or more particularly the list of the topology and routing management units that are adjacent, in the sense of the topology of the network VPN1. Thus, in the example illustrated in FIG. 4, the topology table managed by PE1 for its interface with the network 401 indicates, in the guise of adjacent border routers, the following list: PE2, PE6 and PE7, or more precisely the management unit for VPN1 on PE2, the management unit for VPN1 on PE6 and the management unit for VPN1 on PE7.

This topology table 300 is updated according to a topology protocol which makes it possible to broadcast in the transmission system the information required for updating the topology tables of the other PE routers of the same VPN. For this purpose, the router PE1 comprises a topology interface 301 which manages at one and the same time the sending and receiving of the topology messages according to a broadcast in the system 100. On message reception on this interface 301, an update 306 of the topology table 300 is provided for.

This topology table 300 is advantageously consulted for any routing update in the VPN1.

For the management of routing, provision is made for each management entity of a PE router to manage, in addition to a topology table per VPN, a routing table per VPN. This routing table contains information on the routes making it possible to reach the various items of equipment of one and the same virtual network.

Such routing tables may be similar to those which are used in a network of BGP/MPLS type (VRF RIB (for 'Virtual Routing and Forwarding Routing Information Base')). However, during the updating of such tables, the mechanism for transmitting the routing information within the VPN concerned relies on the topology as indicated in the corresponding topology table.

The management entity 31 furthermore comprises a routing table 302 which may be updated 304 on detection of a change of route relating to the remote network 401. Such messages may be transmitted according to a protocol adapted for exchanges between PE-CE without any limitation being attached to the type of protocol used. Next, such route announcements are thereafter transmitted within the transmission system to the adjacent PEs, and the corresponding remote-network identifiers which are listed in the topology table 300, such as described previously.

The routing table 302 can also be updated 305 on receipt of route announcement messages received from adjacent PEs with regard to the topology of the network VPN1. An interface 303 is in charge of receiving these route announcement messages from other PEs of one and the same VPN.

In one embodiment of the present invention, each interface connecting a VPN site is matched with a corresponding interface management entity which has the charge of the operations relating to this interface.

A routing protocol according to one embodiment of the present invention can correspond to messages comprising the following fields:
<addition/deletion>;
<site identifier>;
<local site identifier for the PE considered>.

The <addition/deletion> field indicates whether a route to the site in question has been added to the announcement in the guise of reachable site or else if it is no longer reachable.

The <Site> field indicates a prefix or else identifier of the remote network concerned.

The <local site identifier for PE considered> field, also referenced <Interface locator>, indicates an item of information making it possible to reach the interface connecting the remote network considered. In fact, the local identifier of a site can correspond to a global interface identifier. The information indicated in this field can then comprise two types of information:
an address of the PE router on which the interface is situated, and
an identifier of the interface aimed at within the PE router.

The information contained in the route announcement messages is used to update the routing tables per interface.

A routing table of a border router, according to one embodiment, indicates for each interface managed at the level of the border router, how to reach sites remote from the VPN considered. An entry of a routing table can indicate an association of the following information:
<destination site>, <destination interface>

More precisely, in one embodiment, the <destination site>information is known only in a local manner by the VPN whereas the <destination interface>information is recognized in a unique manner in the operator's network. This association makes it possible to determine the interface through which it is appropriate to pass in order to reach a given site. Thus, in this case, it is at the local level of a PE router that an interface identifier is translated by identifying the remote network or destination site which corresponds to this interface.

Figure 5:
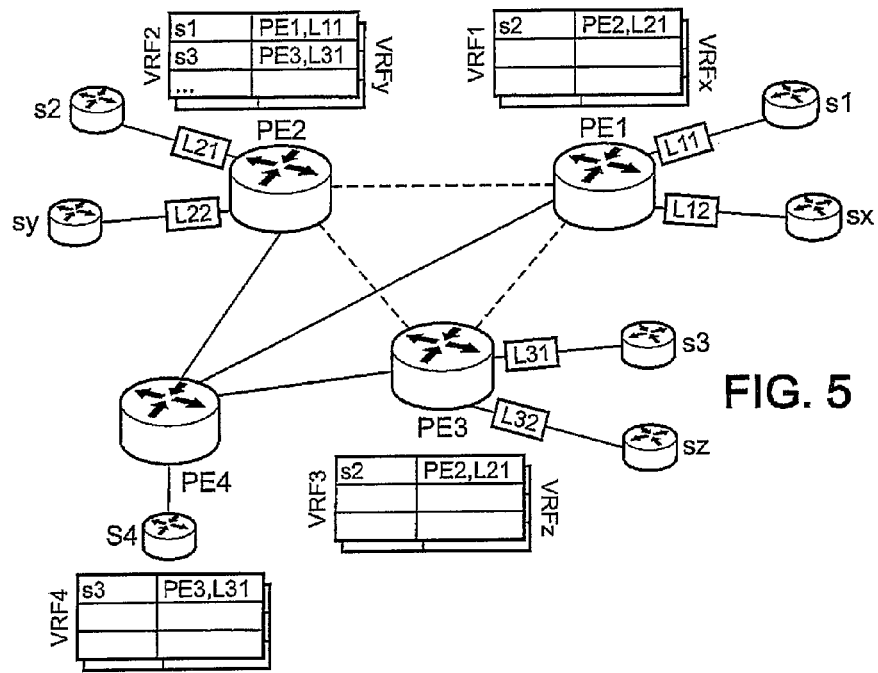
FIG. 5 illustrates an exemplary implementation of a topology and routing table in a transmission system according to one embodiment of the present invention.

In one embodiment, each PE border router manages a topology table and a routing table. FIG. 5 illustrates in detail an exemplary implementation of these topology and routing tables in a configuration of a system 100 according to one embodiment of the present invention. Two respective VPN topologies are represented here. The system 100 comprises border routers PE1, PE2, PE3 and PE4.

A first VPN-A comprises remote networks S1, S2, S3 and S4. A second VPN-B comprises remote networks Sx, Sy and Sz. The border router PE1 connects to the system 100 on the one hand the remote network S1 of the VPN-A and on the other hand the remote network Sx of the VPN-B. The border router PE2 connects to the system 100 on the one hand the remote network S2 of the VPN-A and on the other hand the remote network Sy of the VPN-B. The border router PE3 connects to the system 100 on the one hand the remote network S3 of the VPN-A and on the other hand the remote network Sz of the VPN-B. The border router PE4 connects to the system 100 on the one hand the remote network S4 of the VPN-A.

The router PE1 manages a topology table for the VPN-A network indicating the list of adjacent border routers (PE2, PE3, PE4) and the corresponding remote-network identifiers. It is recalled here that a remote-network identifier identifies an entity for managing the border router in charge of an interface with the remote network. The router PE1 manages a topology table 300 for the VPN-B network indicating the list of adjacent border routers (PE2, PE3) and the corresponding remote-network identifiers.

The router PE2 manages a topology table for the VPN-A network indicating the list of adjacent border routers (PE1, PE3, PE4) and the corresponding remote-network identifiers. The router PE2 manages a topology table for the VPN-B network indicating the list of adjacent border routers (PE1, PE3) and the corresponding remote-network identifiers.

The router PE3 manages a topology table for the VPN-A network indicating the list of adjacent border routers (PE1, PE2, PE4) and the corresponding remote-network identifiers. The router PE2 manages a topology table for the VPN-B network indicating the list of adjacent border routers (PE1, PE3) and the corresponding remote-network identifiers.

The router PE4 manages a topology table for the VPN-A network indicating the list of adjacent border routers (PE1, PE2, PE3) and the corresponding remote-network identifiers.

The topology tables are not represented in FIG. 5.

The router PE1 manages a routing table, as in a BGP/MPLS network of VRF type (for 'Virtual Routing and Forwarding Table'), VRF1 for the VPN-A and a routing table VRFx of VRF type for the VPN-B. The router PE2 manages a routing table VRF2 for the VPN-A and a routing table VRFy for the VPN-B. The router PE3 manages a routing table VRF3 for the VPN-A and a routing table VRFz for the VPN-B. The router PE4 manages a routing table VRF4 for the VPN-A.

Hereinafter, only the tables relating to the VPN-A are represented and described.

The table VRF1 of the router PE1 indicates a route for reaching the remote network S2 from the remote network S1, in the pair (PE2, L21), where PE2 represents an MPLS label of the border router PE2 and L21 is a label internal to the router PE2 which identifies the output interface for exit toward the site S2, representing a route for reaching S2 from PE2. Such may be the case when the virtual tunnels of the topology of the VPNs are created on the basis of a technology of MPLS type.

The table VRF2 indicates a route for reaching the remote network S1 via the pair (PE1, L11), where PE1 represents an MPLS label of the border router PE1 and L11 is a label internal to the router PE1 which identifies the output interface for exit toward the site S1, representing a route for reaching S1 from PE1. It also indicates a route for reaching the remote network S3 via the link (PE3, L31), where L31 is a route for reaching S3 from PE3.

The table VRF3 indicates a route for reaching the remote network S2 via the pair (PE2, L21), where PE2 represents an MPLS label of the border router PE2 and L21 is a label internal to the router PE2 which identifies the output interface for exit toward the site S2, representing a route for reaching S2 from PE2.

The table VRF4 indicates a route for reaching the remote network S3 via the pair (PE3, L31).

In such a context, for example when a packet arrives in the system 100 from the remote network S2 destined for the remote network S1 in the VPN-A, it is firstly received by the router PE2. The router PE2 routes this packet according to the information stored in its table VRF2 which for this purpose indicates the pair (PE1, L11).

It should be noted that the VPN-B relies on the border routers PE1 to PE3. Thus, advantageously, when a route announcement is received for the VPN-B, by the router PE2 for example, it is transmitted to the border routers adjacent to this router PE2 which are listed in its corresponding topology table, that is to say the routers PE1 and PE3 and the corresponding remote-network identifiers, but it is not transmitted to the router PE4 which does not itself form part of the VPN-B considered.

Such tables make it possible to guarantee that the various VPNs are isolated from one another within one and the same transmission system. It also allows independence of the addressing per VPN. Indeed, each VPN can freely reach its equipment and its sites and is responsible for the consistency of its addressing. A VPN can even use addresses which belong to the space of private addresses, that is to say non-routable addresses.

It may be noted that within the network, the packets are routed on the basis of core routing tables of the network. These network core tables may be updated on the basis of a protocol of IGP type (for 'Interior Gateway Protocol') such as for example a link state protocol such as the ISIS (for 'Intermediate System to Intermediate System') or OSPF (for 'Open Shortest Path First') protocol. However, no limitation is attached to the protocol of this type used within the system for the network.

Figure 6:
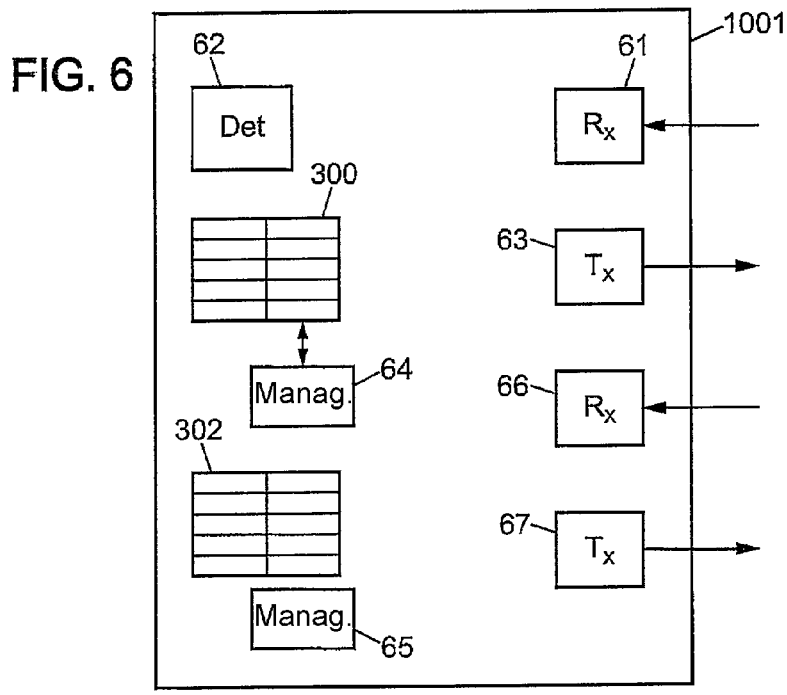
FIG. 6 illustrates a border router according to one embodiment of the present invention.

FIG. 6 illustrates a border router according to one embodiment of the present invention.

The border router comprises:
  a reception unit 61 adapted for detecting a change of route from a network remote from said given virtual network;
  a determination unit 62 adapted for determining one or more adjacent border routers and the corresponding remote-network identifiers for said virtual network on the basis of the topology table; and
  a transmission unit 63 adapted for transmitting the change of route to said adjacent border routers, while indicating the remote-network identifiers determined.

The border router can comprise a topology management unit 64 adapted for managing the topology table of a virtual network by updating it according to a topology protocol as a function of the configuration of said virtual network. The topology table for a virtual network is thus updated according to a topology protocol as a function of the configuration of said virtual network. The topology protocol comprises a topology broadcasting signal indicating a border router by which said remote network is connected to the transmission system and a corresponding remote-network identifier.

This border router can comprise a routing management unit 65 adapted for managing a routing table per virtual network indicating information about paths available for transmitting packets to the remote networks of said virtual network, the routing table being updated on detection of a change of route, said change of route indicating whether a path should be added, deleted or modified in the routing table.

The border router may be adapted for receiving and managing a change of route received from a remote network is according to a protocol of PE-CE type such as for example BGP, ISIS, OSPF etc.

The border router can furthermore comprise another reception unit 66 which is adapted for receiving route announcements from a remote network or else another border router, and another transmission unit 67 which is adapted for transmitting the route announcements received to the adjacent border routers for the VPN concerned and the corresponding remote-network identifiers.

The invention claimed is:

1. A method of routing in a transmission system comprising a plurality of border routers;
  said system managing a plurality of virtual networks, each linking several mutually remote networks;
  a border router managing a topology table indicating, for a given virtual network, one or more adjacent border routers and for an adjacent border router, at least one remote-network identifier;
  said method comprising the following steps at the level of said border router managing said topology table:
    detecting a change of route relating to a remote network of said given virtual network;
    on the basis of the topology table, determining for said given virtual network, one or more adjacent border routers and the corresponding remote-network identifier or identifiers; and
    transmitting the change of route to said adjacent border routers, while indicating the remote-network identifier or identifiers determined.

2. The routing method of claim 1, in which the topology table for said given virtual network is updated according to a topology protocol as a function of a configuration of said virtual network,
  said topology protocol comprising a topology broadcasting signal indicating a border router by which said remote network is connected to the transmission system and the corresponding remote-network identifier.

3. The routing method of claim 1, in which the border router managing said topology table manages a routing table per virtual network indicating information about paths available for transmitting packets to the remote networks of said virtual network,
  the routing table being updated on receipt of a change of route transmitted by another border router, said change of route indicating whether a path should be added, deleted or modified in the routing table.

4. A border router in a transmission system comprising a plurality of border routers;
  said system managing a plurality of virtual networks, each linking several mutually remote networks;
  said border router in said transmission system managing a topology table indicating, for a given virtual network, one or more adjacent border routers and for an adjacent border router, at least one remote-network identifier;
  said border router managing said topology table comprising:
    a reception unit adapted for detecting a change of route relating to a remote network of said given virtual network;
    a determination unit adapted for determining, for the given virtual network, one or more adjacent border routers and the corresponding remote-network identifiers on the basis of the topology table; and
    a transmission unit adapted for transmitting the change of route to said adjacent border routers, while indicating the remote-network identifiers determined.

5. The border router in said transmission system of claim 4, comprising a topology management unit adapted for managing the topology table of said given virtual network by updating it according to a topology protocol as a function of a configuration of said given virtual network, the topology table for said given virtual network being updated according to said topology protocol as a function of the configuration of said virtual network, said topology protocol comprising a topology broadcasting signal indicating a border router by which said remote network is connected to the transmission system and a corresponding remote-network identifier.

6. The border router managing said topology table of claim 4, comprising a routing management unit adapted for managing a routing table per virtual network indicating information about paths available for transmitting packets to the remote networks of said virtual network, the routing table being updated on receipt of a change of route transmitted by another border router, said change of route indicating whether a path should be added, deleted or modified in the routing table.

7. A transmission system comprising a plurality of border routers;

said system managing a plurality of virtual networks, each linking several mutually remote networks;

a border router managing a topology table indicating, for a given virtual network, one or more adjacent border routers and for an adjacent border router, at least one remote-network identifier;

said border router managing said topology table comprising:

a reception unit adapted for detecting a change of route relating to a remote network of said given virtual network;

a determination unit adapted for determining, for said given virtual network, one or more adjacent border routers and the corresponding remote-network identifiers on the basis of the topology table; and a transmission unit adapted for transmitting the change of route to said adjacent border routers, while indicating the remote-network identifiers determined.

8. A non-transitory computer-readable storage medium storing instructions for the implementation of the method of claim 1 wherein the program is executed by a processor.

* * * * *